W. K. HENRY.
SCREWLESS KNOB.
APPLICATION FILED MAR. 20, 1911.

993,298. Patented May 23, 1911.

Witnesses:
Chas. A. Beard
Fred K. M. Dannenfelser

Inventor
W. K. Henry
By his Attorneys

UNITED STATES PATENT OFFICE.

WILLIAM K. HENRY, OF NEW BRITAIN, CONNECTICUT, ASSIGNOR TO P. & F. CORBIN, OF NEW BRITAIN, CONNECTICUT, A CORPORATION OF CONNECTICUT.

SCREWLESS KNOB.

993,298.

Specification of Letters Patent.   Patented May 23, 1911.

Application filed March 20, 1911. Serial No. 615,721.

*To all whom it may concern:*

Be it known that I, WILLIAM K. HENRY, a citizen of the United States, residing at New Britain, county of Hartford, State of Connecticut, have invented certain new and useful Improvements in Screwless Knobs, of which the following is a full, clear, and exact description.

My invention relates to improvements in so-called screwless knobs, the object being to provide a construction which is exceedingly simple and which may be manufactured at a minimum of cost, the construction also being such that it permits the knob to be adjusted to a nicety to and fro on the spindle.

Figure 1:
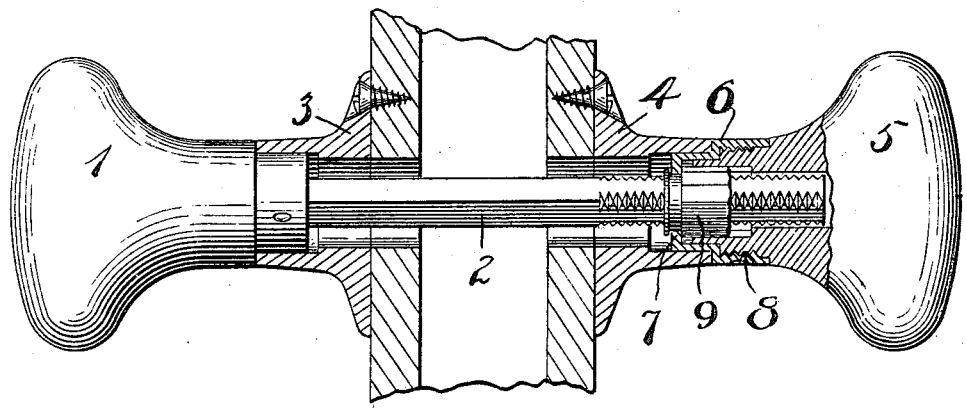
Figure 2:
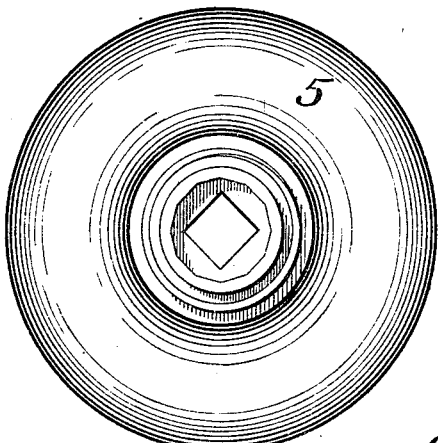
Figure 3:
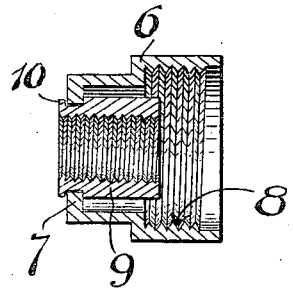
Figure 4:
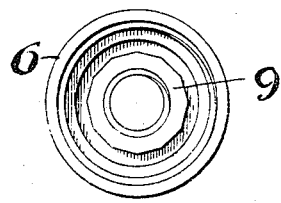

In the drawings, Figure 1 is in the main a longitudinal section of two knobs mounted upon a spindle and showing my device in operative position. Fig. 2 is a view of the inner end of a screwless knob detached. Fig. 3 is a longitudinal section of the adjusting nut and coupling assembled. Fig. 4 is an end elevation thereof.

1 represents a knob carrying a spindle 2. The spindle is of the usual rectangular form in cross section and is, at its corners, threaded in the manner well-known in this art.

3—4 represent the roses, or escutcheon plates, customarily provided.

5 is a companion knob having a rectangular passage arranged to receive the spindle 2, said knob being slidable to and fro on said spindle, but not rotatable independently thereof.

6 is a coupling device contracted at 7 at one end while its opposite end is threaded to take onto a corresponding thread on the inner end of the knob 5, as indicated at 8.

9 is an adjusting nut. This nut is threaded on its interior to take upon the threaded corners of the spindle 2. The outer wall of the nut 9 is flattened to provide a relatively large number of flat surfaces. The extreme inner end of the knob shank is shaped to correspond with the external shape of the nut 9. The nut 9 is preferably carried by the coupling 6, said nut being provided with a flanged extension 10 which passes through the contracted inner end of said coupling 6 and is upset so as to hold said parts together and yet so as to permit the nut to be rotated independently of the coupling.

To assemble the parts, the spindle 2 is first passed through the escutcheons or roses, the knob 1 being brought into proper relation with its particular rose, in this instance the rose 3. The coupling 6 and the nut 9 are then applied to the free end of the spindle, the nut being screwed down thereon until it carries the coupling forwardly until it projects into and receives the proper support from the rose 4. The nut is then carefully adjusted until said coupling (which is provided with a shoulder to take against the end of the rose) is drawn up to the proper position to secure the desired adjustment in which the spindle may be turned freely and yet may not be allowed too much end play. When this adjustment has been effected, the knob 4 is slid onto the spindle 2, the extreme inner end of the shank of the knob 5 being passed over the nut 9. As soon as the extreme inner end of the spindle is projected slightly over the nut, it will be found that the threaded end of the coupling will engage the threaded part of the shank of the knob 5 and thereupon said coupling may be turned. This turning of the coupling will have the effect of drawing all of the parts together into binding contact. Since the knob cannot turn on the spindle, and since the inner end of the knob shank overlies the nut 9, it follows that said rotation of the coupling will not disturb the adjusted position of the nut, but will operate simply to draw the knob snugly into place. The turning of the coupling is continued until it is screwed fully into place on the shank of the knob 5, in which position the knob 5 will remain fixed, and in which position it will be found that the spindle may be turned with the desired degree of freedom and yet will be prevented from any undesirable endwise movement, this being determined by the adjusted position of the nut. By reason of the shape of the nut, and particularly its outer surface, which engages within the inner end of the knob shank, it is obvious that said knob and nut may be engaged in any one of many positions. In other words, the nut may be given a very slight turn in or out for the purpose of securing a very close adjustment and still it will be found that the knob may be slid over the same in such a manner as to hold it against turning. In the drawings, the nut is shown as having an external surface provided with at least twelve surfaces, from which it follows that the nut may be adjusted a twelfth of one complete turn in either direction, which permits, as will be apparent, a minute variation in the adjustment of the knobs on the spindle. For all practical purposes I have found that such an adjustment will be close enough to care for any and all conditions that may be met.

What I claim is:

1. In a screwless knob construction, a spindle angular in cross section, the corners of said spindle being threaded, a knob slidable but not rotatable upon said spindle, a knob shank having a thread thereon, a nut threaded upon said spindle, the external wall of said nut being provided with a multitude of flat surfaces, the inner end of the shank being shaped to receive the nut and hold it against being turned, a coupling sleeve arranged to engage the forward end of said nut, and a screw thread engagement between said coupling and the knob shank.

2. In a screwless knob construction, a spindle, angular in cross section, the corners of said spindle being threaded to receive a nut, a knob slidable but not rotatable on said spindle, a coupling threaded on the shank of said knob and detachable therefrom, a nut mounted within said coupling to rotate, said nut being provided with a multitude of flat surfaces at its larger diameter, said surfaces being substantially parallel with the axis of the spindle, the inner end of the knob shank being recessed to provide a corresponding number of flat surfaces whereby said nut may be received therein, and whereby, when said nut is located therein, it cannot be turned on said spindle, and a screw threaded connection between said coupling and the shank of said knob.

3. In a screwless knob construction, a spindle, angular in cross section, the corners of said spindle being threaded to receive a nut, a knob slidable but not rotatable on said spindle, a coupling threaded on the shank of said knob and detachable therefrom, a nut mounted within said coupling to rotate, said nut being provided with a multitude of flat surfaces at its larger diameter, said surfaces being substantially parallel with the axis of the spindle, the inner end of the knob shank being recessed to provide a corresponding number of flat surfaces whereby said nut may be received therein, and whereby when said nut is located therein, it cannot be turned on said spindle, a screw threaded connection between said coupling and the shank of said knob, and means to prevent endwise separation of said coupling and nut.

WILLIAM K. HENRY.

Witnesses:
LEONARD B. MALLORY,
WM. V. COLLINS.

---

Copies of this patent may be obtained for five cents each, by addressing the "Commissioner of Patents, Washington, D. C."